US009559892B2

(12) United States Patent
Dharmadhikari et al.

(10) Patent No.: US 9,559,892 B2
(45) Date of Patent: Jan. 31, 2017

(54) FAST NODE/LINK FAILURE DETECTION USING SOFTWARE-DEFINED-NETWORKING

(71) Applicant: DELL PRODUCTS, L.P., Round Rock, TX (US)

(72) Inventors: Vivek Dharmadhikari, San Jose, CA (US); Sanjay Sane, Fremont, CA (US); Vinay Sawal, Fremont, CA (US)

(73) Assignee: DELL PRODUCTS LP, Round Rock, TX (US)

( * ) Notice: Subject to any disclaimer, the term of this patent is extended or adjusted under 35 U.S.C. 154(b) by 0 days.

(21) Appl. No.: 14/254,800

(22) Filed: Apr. 16, 2014

(65) Prior Publication Data

US 2015/0304158 A1  Oct. 22, 2015

(51) Int. Cl.
*G06F 11/00* (2006.01)
*H04L 12/24* (2006.01)
*H04L 12/26* (2006.01)

(52) U.S. Cl.
CPC ......... *H04L 41/046* (2013.01); *H04L 41/0677* (2013.01); *H04L 43/0817* (2013.01)

(58) Field of Classification Search
CPC .................. G06F 11/0793; G06F 11/0709
USPC .......................................................... 714/48
See application file for complete search history.

(56) References Cited

U.S. PATENT DOCUMENTS

| | | | | |
|---|---|---|---|---|
| 6,574,197 B1* | 6/2003 | Kanamaru | ............. | H04L 41/12 370/230 |
| 7,496,659 B1* | 2/2009 | Coverdill | ............ | H04L 43/0811 370/252 |
| 7,856,639 B2* | 12/2010 | Bhagwan | ............ | G06F 11/1482 719/319 |
| 8,243,609 B2* | 8/2012 | Sakurai | ................ | B60W 50/02 370/242 |
| 8,635,319 B1* | 1/2014 | Cuthbert | ............. | H04L 43/0811 709/223 |
| 9,032,073 B1* | 5/2015 | Cuthbert | ............. | H04L 43/0811 709/224 |
| 9,367,409 B2* | 6/2016 | Cho | .................... | G06F 11/2033 |
| 9,391,848 B1* | 7/2016 | Shazly | ................ | H04L 41/5009 |

(Continued)

OTHER PUBLICATIONS

Hedlund, Brad, "Understanding Hadoop Clusters and the Network," http://bradhedlund.com/2011/09/10/understanding-hadoop-clusters-and-the-network/, Sep. 10, 2011 (23pgs).

(Continued)

*Primary Examiner* — Amine Riad
(74) *Attorney, Agent, or Firm* — North Weber & Baugh LLP (57) ABSTRACT

Embodiments of the present invention include systems and methods for detecting failure of node, link, or both, in a network. The system for detecting failure of nodes, link, or both, in a network includes an agent that monitors status of one or more applications on a first end node, sends a status notice related to the applications on the first end node to a controller through an input-output (IO) port, receives status information of at least one application on a second end node from the controller through the IO port, and stores the status information into a memory. When the agent receives a query from an application on the first end node, it looks up the status information in the memory to check aliveness of an application on the second end node.

19 Claims, 5 Drawing Sheets

(56) References Cited

U.S. PATENT DOCUMENTS

| | | | | |
|---|---|---|---|---|
| 2002/0087920 | A1* | 7/2002 | Gallo | G11B 27/002 714/47.1 |
| 2003/0126240 | A1* | 7/2003 | Vosseler | G06F 11/0709 709/221 |
| 2006/0198695 | A1* | 9/2006 | Kano | H04L 45/02 403/408.1 |
| 2007/0256082 | A1* | 11/2007 | Bhagwan | G06F 11/1482 719/316 |
| 2014/0304399 | A1* | 10/2014 | Chaudhary | H04L 41/5009 709/224 |

OTHER PUBLICATIONS

Iwaszczuk, Jonathan et al., Arista Networks, "Higher Performance for HPC with a focus on Big Data and innovative features," presented live at HPC Sep. 2013, printed from https://www.flag-gmgmt.com/hpc/PPT/2013%20HPC%20Session%202-Jonathan%20Iwaszczuk%209.12.13.pdf (28pgs).

Brad Hedlund, "Understanding Hadoop Clusters and the Network," http://bradhedlund.com/2011/09/10/understanding-hadoop-clusters-and-the-network/ (26pg).

\* cited by examiner

FAST NODE/LINK FAILURE DETECTION USING SOFTWARE-DEFINED-NETWORKING

TECHNICAL FIELD

The present invention relates to detection of failure in a network communication, more particularly, to systems and methods for detecting failure of node, link, or both using software-defined networking infrastructure.

DESCRIPTION OF THE RELATED ART

Figure 1:
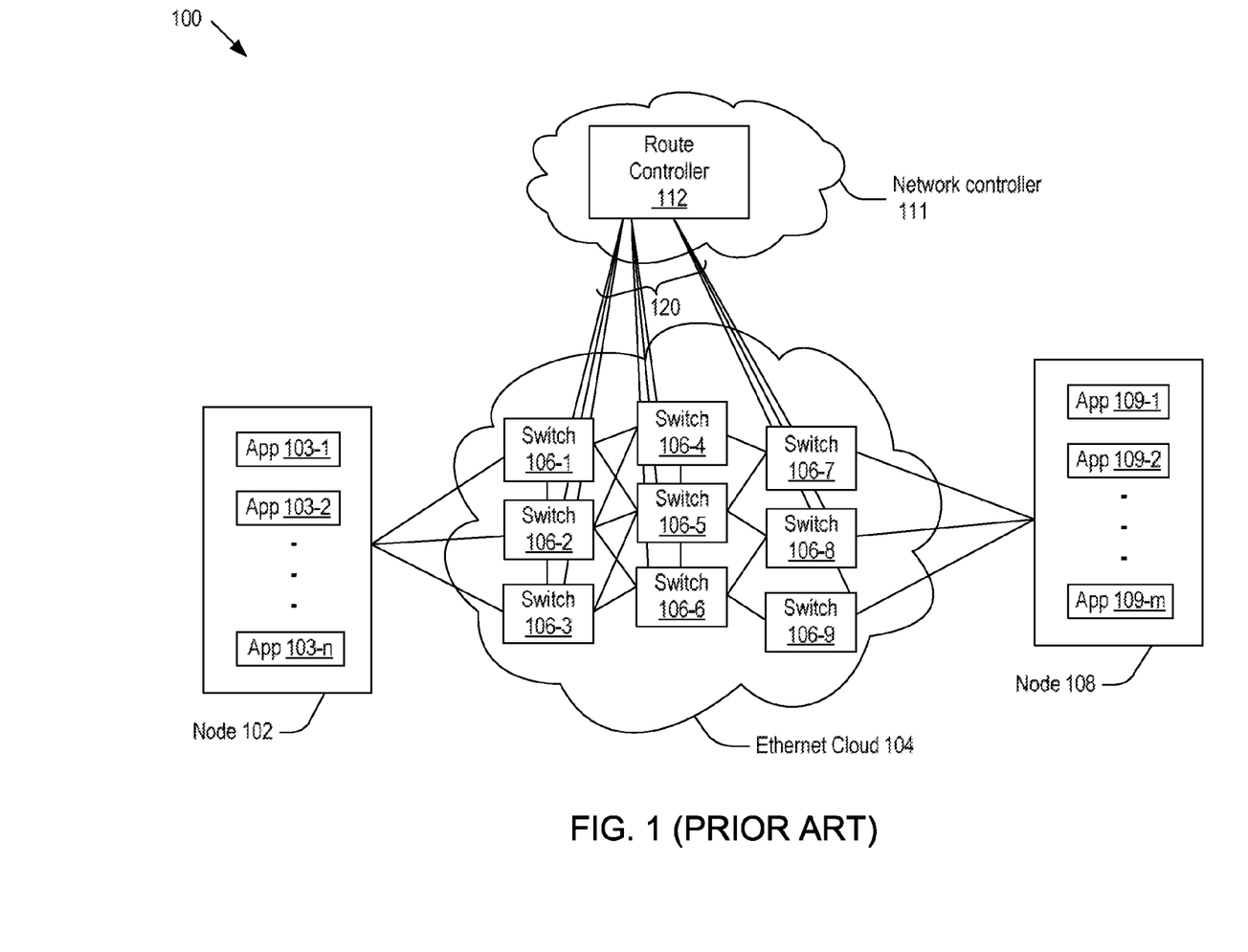
FIG. 1 shows a schematic diagram of a conventional network system.

In general, the conventional network elements spend a lot of resources to determine end-to-end connectivity between nodes. FIG. 1 shows a schematic diagram of a conventional network system/topology 100. As depicted, the two nodes 102 and 108 communicate to each other through an Ethernet cloud 104, where multiple switches 106 are used to form multi-hop topology between the two nodes. Each of the nodes 102 and 108 may be a server and multiple applications 103 and 109 may be installed in the nodes 102 and 108, respectively. For brevity, only two nodes are shown in FIG. 1.

Each of the switches 106 is coupled to a route controller 112 in a network controller 111, as indicated by lines 120, and sends a status notice to the route controller 112. The route controller 112 monitors the connectivity between the switches 106 within the Ethernet cloud 104, but not the status of nodes 102 and 108. As such, the nodes 102 and 108 should keep on checking the aliveness of the communication session therebetween to avoid data loss when one of the nodes and/or a switch on the communication path is down.

Aliveness of the communication session(s) between the nodes 102 and 108 may be checked at various levels, such as link level, protocol level, or application level. Typically, the aliveness check is performed by use of hello packets, where a hello packet (or, equivalently keepalive packet) is data sent to test the connection between two nodes. For instance, when the node 108 receives a hello packet from the node 102, the node 108 sends a return packet to the node 102. When the aliveness/connectivity check between two nodes is based on the conventional hello/return packets, the total time and resource consumption for connectivity checks in the system 100 is directly proportional to the total number of nodes/links in the system 100. Furthermore, when the aliveness/connectivity check is performed at the application level, each end application pair is responsible for maintaining connectivity check by periodically exchanging hello packets. For instance, in FIG. 1, the node 102 having n number of applications/virtual machines running thereon and the node 108 having m number of applications/virtual machines running thereon may exchange n×m number of hello packets to check the aliveness of the communication session between them. This conventional approach requires unnecessary traffic bandwidth of the system 100 and CPU processing of the nodes 102 and 108. Accordingly, there is a need for efficient systems and methods for detecting and eliminating failed node/interconnects between end nodes.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or nodes, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components or nodes. Components or nodes may be implemented in software, hardware, or a combination thereof.

Furthermore, connections between components/nodes/switches within the figures are not intended to be limited to direct connections. Rather, data between these components may be modified, re-formatted, or otherwise changed by intermediary components. Also, additional or fewer connections may be used. It shall also be noted that the terms "coupled" "connected" or "communicatively coupled" shall be understood to include direct connections, indirect connections through one or more intermediary devices, and wireless connections.

Furthermore, one skilled in the art shall recognize: (1) that certain steps may optionally be performed; (2) that steps may not be limited to the specific order set forth herein; and (3) that certain steps may be performed in different orders, including being done contemporaneously.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. The appearances of the phrases "in one embodiment," "in an embodiment," or "in embodiments" in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

Figure 2:
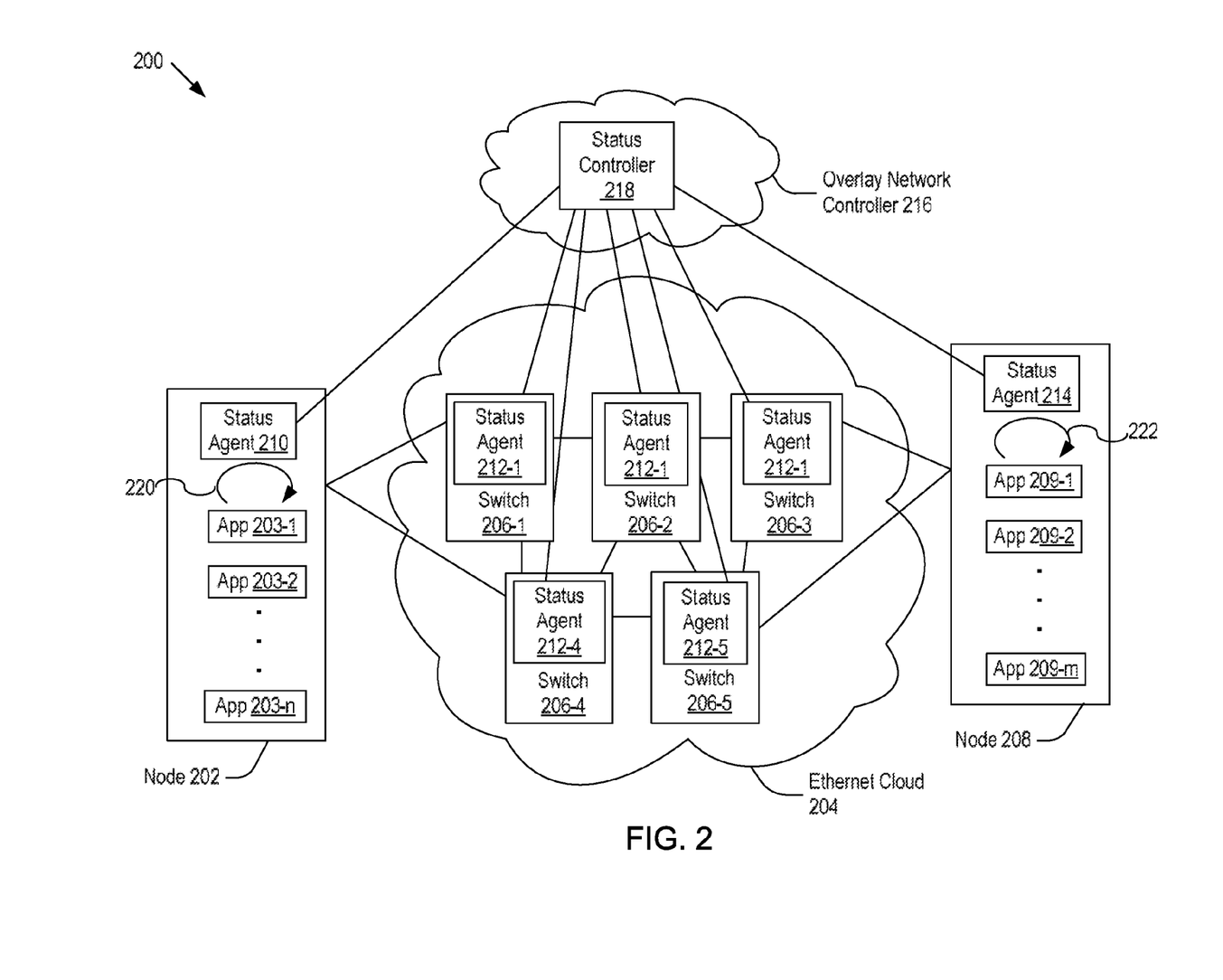
FIG. 2 shows a schematic diagram of an Ethernet network topology having a software-defined-networking (SDN) infrastructure according to embodiments of the present invention.

FIG. 2 shows a schematic diagram of an Ethernet network topology/system 200 having a software-defined-networking (SDN) infrastructure according to embodiments of the present invention. As depicted in FIG. 2, nodes 202 and 208 are connected to each other for communication via an Ethernet cloud 204. For brevity, only two end nodes are shown in FIG. 2. However, it should be apparent to those of ordinary skill in the art that any other suitable number of end nodes may be coupled or connected to the Ethernet cloud 204 and any other suitable cloud/network may be used in place of the Ethernet cloud 204. Also, each node may be any suitable device, such as virtual machine (VM) host server, a computer, a data center, or any other computing device that can communicate data to other node via the Ethernet cloud 204. Hereinafter, the term "node" further refers to an element/entity in the network, such as enode, switch, FSB, and FCF in FIGS. 2 and 3, for instance The nodes 202 and 208 may have one or more applications (such as virtual machines) 203 and 209, respectively, and keepalive applications (or equivalently, status or reporting agents) 210 and 214, respectively. For example, the node 202 may be a VM host server and the status agent 210 is a part of the virtual switch. In another example, the node 202 may be a non-virtualized bare-metal server, and the status agent 210 is a part of the host operating system. It is noted that the status agent 210 may be implemented in any suitable level, such as link level, protocol level, or application level, of each node.

Unlike in the conventional system shown in FIG. 1, in embodiments, a status agent is installed in each of the nodes 202 and 208, coupled to an overlay network controller 216, and periodically gathers status information, such as identity, capability, and protocol state of the corresponding host device. Each status agent may be software, a hardware device, such as field-programmable gateway array (FPGA), or combination thereof. An arrow 220 (or 222) indicates that the status agent 210 (or 214) periodically gathers status information of the applications 203-1-203-$n$ (or 209-1-209-$m$) installed in the host device, node 202 (or 208).

In embodiments, the Ethernet cloud 204 includes one or more switches or routers 206-1-206-5 that are connected to the overlay network controller 216. For brevity, only five switches are shown in FIG. 2, even though any other suitable number of switches may be included in the Ethernet cloud 204. In embodiments, the switches 212-1-212-5 have status agents 212-1-212-5, respectively, where each status agent periodically gathers status information of the host switch to which it belongs and sends the information to the overlay network controller 216.

In embodiments, each status agent in the system 200 gathers and sends the status information of the host device to the overlay network controller 216 each time an event occurs in the host device. Alternatively, the event may be one of periodic signals that trigger the status agent to send the status information, i.e., each status agent periodically gathers and sends the status information of the host device to the overlay network controller 216 at a preset time interval.

The overlay network controller 216 controls an overlay network that is a telecommunications network and runs independently on top of the target network, i.e., Ethernet cloud 204. The overlay network controller 216 includes a keepalive controller (or, equivalently status controller) 218. Each of the status agents 210, 212, and 214 is communicatively coupled/connected to the status controller 218 and exchanges information with the status controller 218. Hereinafter, the term SDN infrastructure collectively refers to a system having the overlay network controller 216 and status agents connected to the overlay network controller. In embodiments, the status controller 218 compiles the information received from the status agents 210, 212, and 214 and generates a reachability graph 230, where the reachability graph 230 indicates a communication route/link between two applications and/or health/aliveness information of all of the nodes, links, and switches along the route. Then, the status controller 218 pushes down the reachability graph to each of the status agents and local clients/protocols in the system 200.

As discussed above, in embodiments, the reachability graph generated by the status controller 218 indicates a route between two nodes 202 and 208 as well as other elements along the communication path. In contrast, the reachability graph of the conventional system 100 is limited to a route formed among the switches 106 in the Ethernet cloud 104. For instance, for a communication session between the applications 203-1 and 209-1, the reachability graph generated by the status controller 218 of the present system not only indicates the sequence of nodes/switches along the communication path from the application 203-1 to the application 209-1 but the applications as well; 203-1->206-1->206-2->206-3->209-1. However, for a communication session between the applications 103-1 and 109-1, the reachability graph generated by the route controller 112 of the prior systems indicates only the sequences of switches along the communication path; 106-1->106-4->106-7.

In conventional systems, an application, say 103-1, sends a hello packet to another remote application, say 109-2, and receives a return packet from the application 109-2 to monitor the aliveness of the communication session therebetween. In contrast, in embodiments, in the event of a node/link failure, the corresponding status agent notifies the status controller 218 of the failure. Upon receiving the failure notice, the status controller 218 looks into the reachability graph and notifies the event to the status agents on relevant nodes, and regenerates a new reachability graph by using alternative paths, to thereby bypass the failed node/link. More specifically, in embodiments, the aliveness information of the remote application 209-2 is reported by the status agent 214 to the status controller 218 even before the application 203-1 queries the status of the remote application 209-2, and the reachability graph is pushed down from the status controller 218 to the status agent 210. Thus, the application 203-1 can check the aliveness status of the remote application 209-2 by locally querying to the status agent 210 that in turn looks into the reachability graph. The status agent 203-1 is acting as a local proxy/agent of the remote application 209-2, i.e., the status query for the aliveness of the remote application 209-2 is replied by the local agent. This approach cuts down the time required to send a conventional hello packet through the Ethernet cloud 204 and wait for a return packet from a remote application. Also, the steps for generating, sending, waiting and receiving the conventional hello/return packets are eliminated, which reduces the traffic bandwidth of the system 200 and CPU cycles of the nodes 202 and 208.

Figure 3:
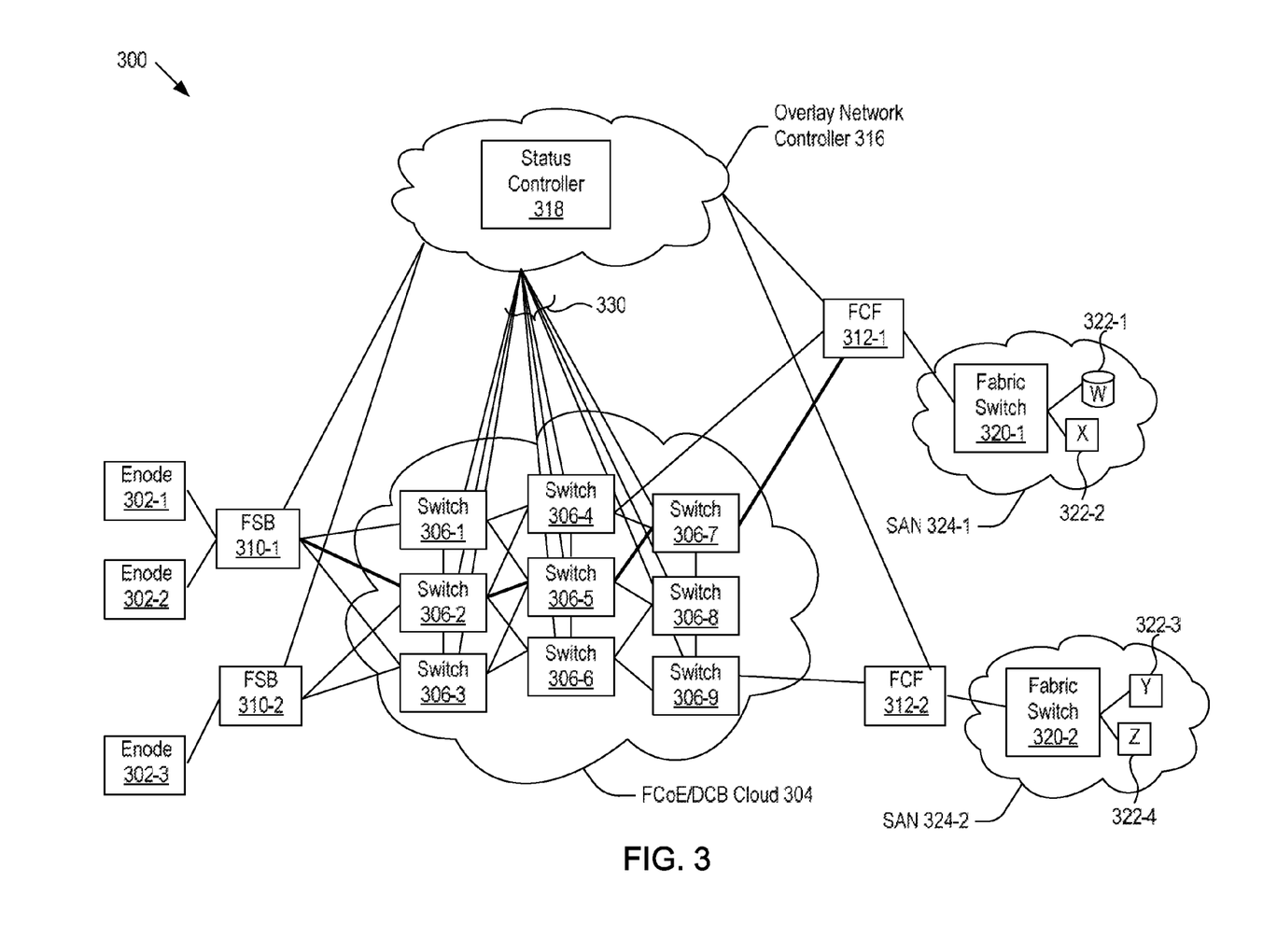
FIG. 3 shows a schematic diagram of a Fiber-Channel-over-Ethernet (FCoE) network topology having an SDN infrastructure according to embodiments of the present invention.

FIG. 3 shows a schematic diagram of a Fiber-Channel-over-Ethernet (FCoE) network topology/system 300 having a software-defined-networking (SDN) infrastructure according to embodiments of the present invention. As depicted, one or more enodes 302-1 and 302-2 are connected to a FIP snooping bridge (FSB) 310-1, and an enode 302-3 is connected to a FIP snooping bridge 310-2. For brevity, only three enodes and two FSBs are shown in FIG. 3. However, it should be apparent to those of ordinary skill in the art that other suitable numbers and combinations of enodes and FSBs can be included in the system 300.

For the purpose of illustration, it is assumed that the enode 302-1 has a multi-hop Fiber-Channel-over-Ethernet (FCoE) session with a target (or target node) 322-1 via a FCoE/data-center-bridging (DCB) cloud 304. The target 322-1 may be a data storage connected to a fabric switch 320-1 in a storage area network (SAN) 324-1, where the fabric switch 320-1 is connected to a fiber channel forwarder (FCF) 312-1 and FCF 312-1 is connected to the FCoE/DCB cloud 304. The enode 302-1 may have a multi-hop FCoE session with other target, say 322-3 or 322-4, in an SAN 324-2 via the FCoE/DCB cloud 304, FCF 312-2, and fabric switch 320-2. It is noted that only two SANs, two fabric switches, and two FCFs are shown in FIG. 3. However, it should be apparent to those of ordinary skill in the art that other suitable numbers of SAN, fabric switches, and targets may be included in the system 300, and that other types of communication cloud may be used in place of the FCoE/DBC cloud 304.

The FCoE/DCB cloud 304 includes nine switches 306-1-306-9, even though other suitable number of switches may be included in the FCoE/DCB cloud. Each of the switches 306-1-306-9 has a status agent (not shown in FIG. 3) that is connected to a status controller 318 of an overlay network controller 316, as indicated by lines 330. Likewise, in embodiments, each of the FSBs 310 and FCFs 312 in the system 300 has a status agent (not shown in FIG. 3) connected to the status controller 318. The overlay network controller 316 and status agents form an SDN infrastructure, which is similar to that in the system 200, i.e., each status agent reports the aliveness/health status information of its host device to the overlay network controller 316, and the overlay network controller 316 (more specifically, the status controller 318) compiles the status information, generates/updates a reachability graph and pushes down the reachability graph to a set of the status agents. Hereinafter, the term "a set of" refers to one, a portion, or all of the objects that immediately follow the term.

For the purpose of illustration, it is assumed that the enode 302-1 communicates with the target 322-1 via a virtual link/path through FSB 310-1, two switches 306-1 and 306-4, FCF 312-1, and fabric switch 320-1. Hereinafter, the terms end node, node, and end-network element will be used interchangeably, where an end node refers to an element that participates in the communication session and is located outside the Ethernet cloud 204 and FCoE/DCB cloud 304. For instance, the end node refers to one or more of the nodes 202, 208, enode 302, FSB 310, FCF 312, fabric switch 320, and targets 322.

If any one of devices in the communication link, say the switch 306-4, fails, the virtual link between the enode 302-1 and target 322-1 is broken and a new virtual link via an alternative path, say FSB 310-1, switch 306-2, switch 306-5, switch 306-7, FCF 312-1, and fabric switch 320-1, may be established. If the system 300 does not have the SDN infrastructure and uses a conventional hello packet to establish the alternative virtual link, the establishment process for the new virtual link would take a significant amount of time and resources. In the conventional systems, it takes 20-30 seconds to establish an FCoE session between two end devices. Also, the conventional failure detection in an FCoE network is achieved through an FCoE-initialization-protocol (FIP) keepalive timer, where the FIP keepalive timer has an expiry time interval of 20-255 seconds. Hence, a total traffic loss of 40-285 seconds is required to reestablish a virtual link in the conventional systems. Also, in conventional approaches, a hello packet may try to traverse the failed switch 306-4 before the status controller 318 finds an alternative path, causing the packet to be dropped. Thus, in conventional approaches, if the status controller 318 is able to establish the alternative path for the session before the FIP timer goes out, the dropped packet would generate a false negative. Finally, in conventional approaches, the probability of failure increases linearly with the increase in the number of intermediate hops inside the FCoE cloud 304.

Unlike the conventional approaches, in embodiments, the SDN infrastructure can prevent the traffic black-holing by performing the following steps. For the purpose of illustration, it is again assumed that the enode 302-1 has a FCoE session with the target 322-1 along the virtual link/path through FSB 310-1, two switches 306-1 and 306-4, FCF 312-1, and fabric switch 320-1, and the switch 306-4 fails during the session. (1) For each FCoE session, the status agents installed in FSB 310-1, FCF 312-1, and switches 306 monitor the aliveness/health status of their host devices. Each status agent has a very fast, typically sub-second, failure detection and notification capability. (2) In the event of an intermediate link/failure (i.e., the failure of the switch 306-4) in the virtual link during the FCoE session, the status agent of the failed switch 306-4 quickly detects and notifies the failure to the overlay network controller 316. (3) Upon receiving the failure notification, the overlay network controller 316 fails over to a standby/alternative path for the FCoE session quickly well before the FIP keepalive timer expiry. These steps prevent the enode 302-1 from dropping the virtual link with the target 322-1, i.e., the alternative path is established to continue the session between the enode 302-1 and target 322-1 before the FIP timer goes out, obviating generation of a false negative.

In embodiments, the SDN infrastructures in FIGS. 2 and 3 do not need any conventional switch-operating system (OS) software for handling hello packets that are sent to inactive destinations. In the conventional systems, a TCP reset mechanism/Internet-control-message-protocol (ICMP) unreachable is implemented as a part of the switching element so that, when a hello packet travels the network and the network knows that the destination is not alive, the TCP reset mechanism/ICMP unreachable will intercept the hello packet and send back a TCP reset packet. This TCP reset mechanism/ICMP unreachable requires a special switch OS software on each of the networking nodes. In the current case, such switch-OS software is not needed, reducing the consumption of resources in the system 300.

Figure 4:
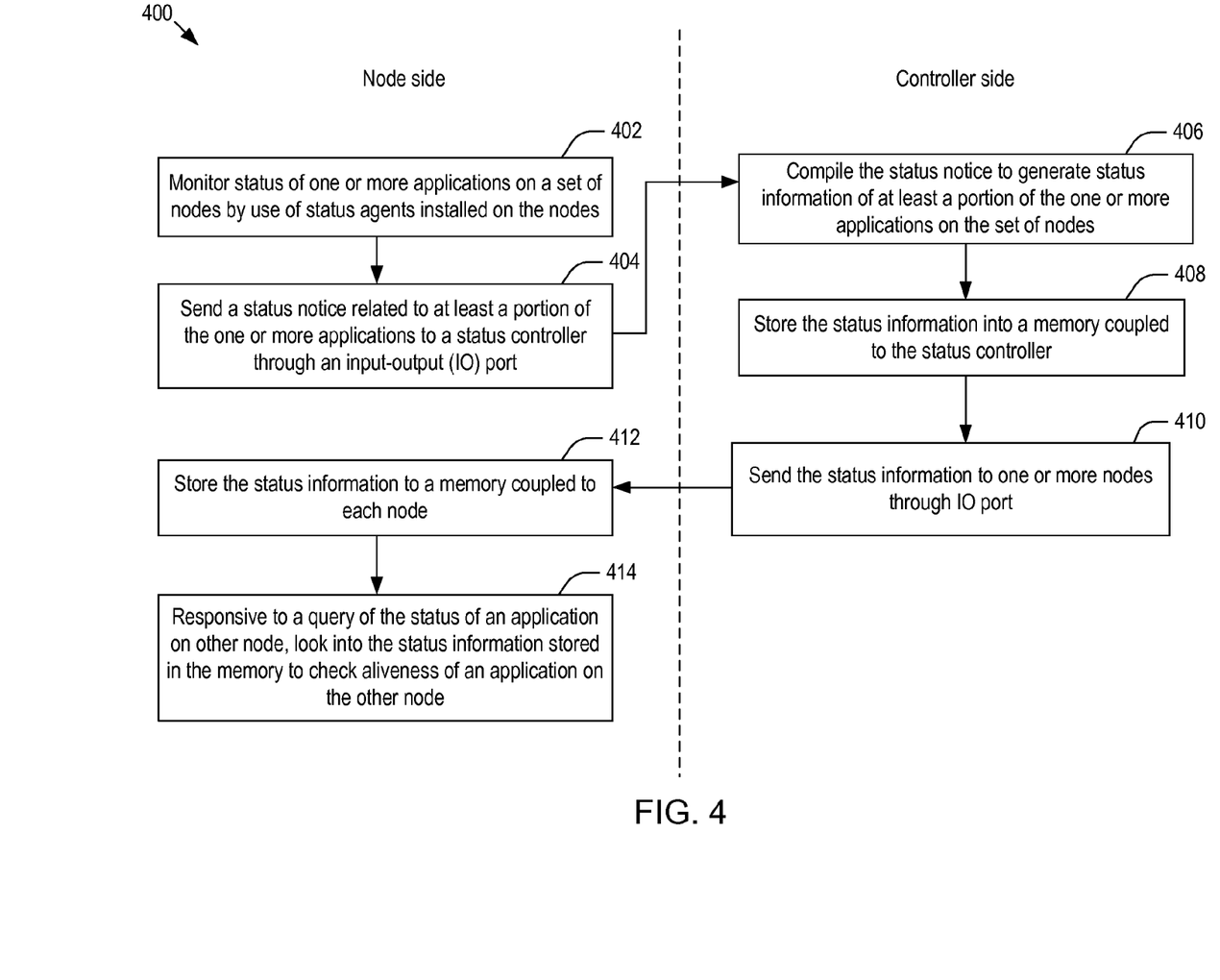
FIG. 4 shows a flowchart of an illustrative process for detecting failure of node and/or link using an SDN infrastructure according to embodiments of the present invention.

FIG. 4 shows a flowchart of an illustrative process 400 for detecting failure of node and/or link using a software-defined networking infrastructure according to embodiments of the present invention. As depicted, steps 402, 404, 412 and 414 on the node side are performed by one or more status agents installed on a set of nodes, while steps 406, 408, and 410 on the controller side are performed by a status controller, such as 218 and 318. At step 402, each status agent monitors the status of one or more applications on its host node, i.e., one or more applications on a set of nodes are monitored by status agents installed on the set of nodes.

At step 404, each status agent sends a status notice related to at least a portion of the applications on the host node to a status controller, such as 218 and 318, through an input-output (TO) port of the host node. In embodiments, each agent sends the notice each time when an application on the host node has a status change. Alternatively, each agent periodically sends the notice at a preset time interval. In embodiments, the notice is related to all of the applications on the host node. Alternatively, the notice is related to only a portion of the applications on the host node that have experienced status changes since the preceding status notice was sent to the status controller. Then, the process proceeds to step 406.

At step 406, the status controller compiles the one or more status notices to generate status information of at least a portion of the one or more applications on the set of nodes. In embodiments, the status controller compiles only selected information of the status notices, depending on the needs. Alternatively, the status controller compiles all of the status notices. Then, optionally, at step 408, the status controller stores the compiled information in a memory (not shown in FIGS. 2 and 3) communicatively coupled to the status controller. The compiled status information may include a reachability graph that indicates a route between two applications on the set of nodes.

At step 410, the status controller sends the status information to one or more nodes in the network through the IO ports of the nodes. In embodiments, the status information sent to a particular node is related to the other nodes coupled to the particular node via the network. For instance, the status information sent to a particular node, say FSB 310-1, is related to FSB 310-2, switches 306, and FCFs 312-1 and 312-2 in FIG. 3. Alternatively, the status information is related to all of the nodes, including the particular node.

At step 412, the status agent on the host node receiving the status information from the status controller stores the status information in a memory (not shown in FIGS. 2 and 3) communicatively coupled to the host node. When one or more of the applications of the host node queries the status of an application on other node, the status agent looks into the status information stored in the memory to check the aliveness of the application on the other node at step 414.

In embodiments, one or more computing system may be configured to perform one or more of the methods, functions, and/or operations presented herein. Systems that implement at least one or more of the methods, functions, and/or operations described herein may comprise an application or applications operating on at least one computing system. The computing system may comprise one or more computers and one or more databases. The computer system may be a single system, a distributed system, a cloud-based computer system, or a combination thereof.

It shall be noted that the present invention may be implemented in any instruction-execution/computing device or system capable of processing data, including, without limitation phones, laptop computers, desktop computers, and servers. The present invention may also be implemented into other computing devices and systems. Furthermore, aspects of the present invention may be implemented in a wide variety of ways including software (including firmware), hardware, or combinations thereof. For example, the functions to practice various aspects of the present invention may be performed by components that are implemented in a wide variety of ways including discrete logic components, one or more application specific integrated circuits (ASICs), and/or program-controlled processors. It shall be noted that the manner in which these items are implemented is not critical to the present invention.

Figure 5:
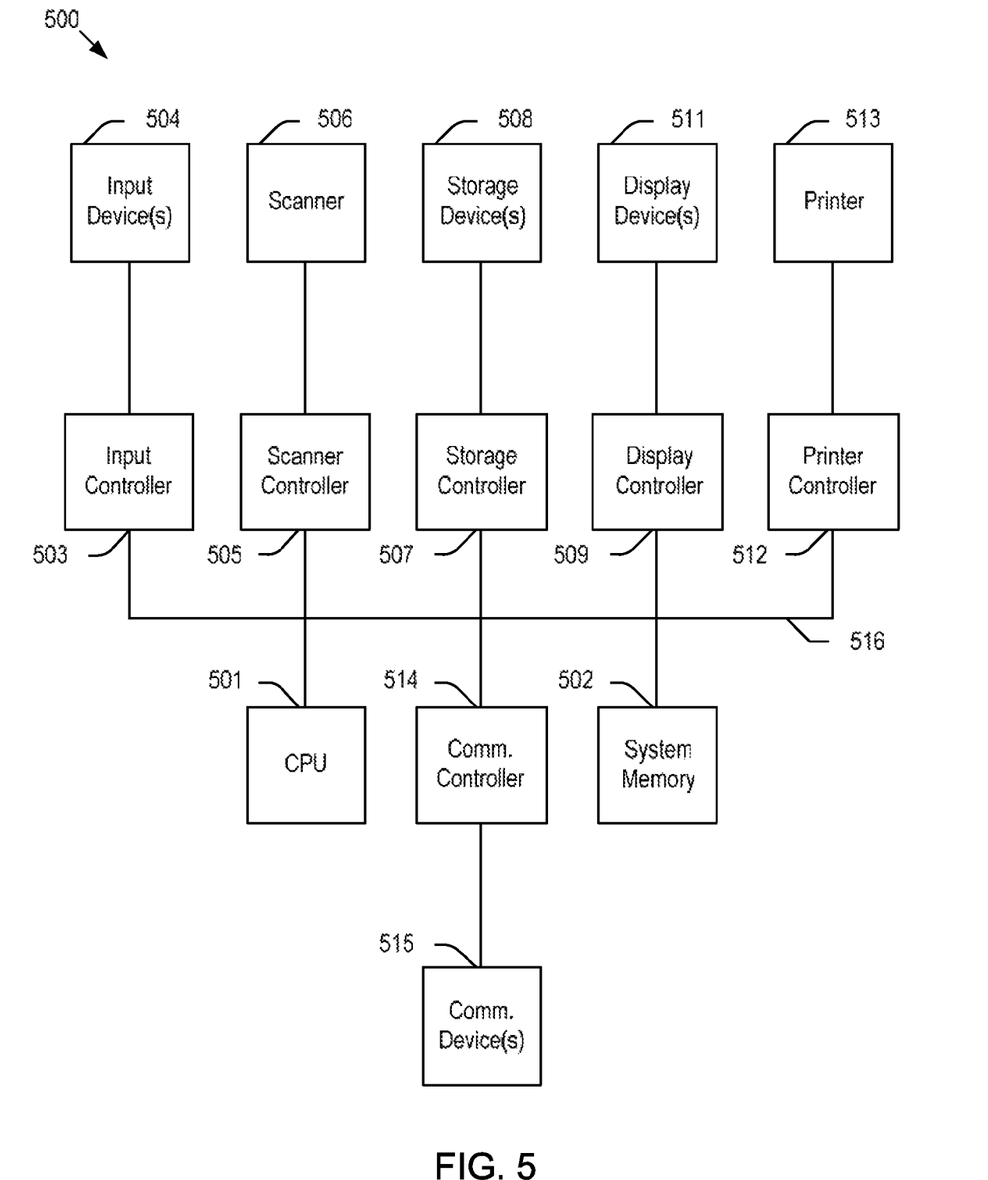
FIG. 5 shows a computer system according to embodiments of the present invention.

Having described the details of the invention, an exemplary system 500, which may be used to implement one or more aspects of the present invention, will now be described with reference to FIG. 5. Each node/element in FIGS. 2 and 3 includes one or more components in the system 500. As illustrated in FIG. 5, system 500 includes a central processing unit (CPU) 501 that provides computing resources and controls the computer. CPU 501 may be implemented with a microprocessor or the like, and may also include a graphics processor and/or a floating point coprocessor for mathematical computations. System 500 may also include a system memory 502, which may be in the form of random-access memory (RAM) and read-only memory (ROM).

A number of controllers and peripheral devices may also be provided, as shown in FIG. 5. An input controller 503 represents an interface to various input device(s) 504, such as a keyboard, mouse, or stylus. There may also be a scanner controller 505, which communicates with a scanner 506. System 500 may also include a storage controller 507 for interfacing with one or more storage devices 508 each of which includes a storage medium such as magnetic tape or disk, or an optical medium that might be used to record programs of instructions for operating systems, utilities and applications which may include embodiments of programs that implement various aspects of the present invention. Storage device(s) 508 may also be used to store processed data or data to be processed in accordance with the invention. System 500 may also include a display controller 509 for providing an interface to a display device 511, which may be a cathode ray tube (CRT), a thin film transistor (TFT) display, or other type of display. System 500 may also include a printer controller 512 for communicating with a printer 513. A communications controller 514 may interface with one or more communication devices 515, which enables system 500 to connect to remote devices through any of a variety of networks including the Internet, an Ethernet cloud, an FCoE/DCB cloud, a local area network (LAN), a wide area network (WAN), a storage area network (SAN) or through any suitable electromagnetic carrier signals including infrared signals.

In the illustrated system, all major system components may connect to a bus 516, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Embodiments of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiment are exemplary and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention.

What is claimed is:

1. An agent installed in a first end node and communicatively coupled to a controller and to a second end node via one or more switches in a network, the agent performing the steps comprising:
   monitoring status of one or more applications on the first end node;
   sending a status notice that includes information regarding at least a portion of the monitored status of the one or more applications on the first end node to the controller;
   receiving status information of at least one application on the second end node from the controller; and
   storing the status information into a memory.

2. An apparatus as recited in claim 1, further comprising:
   responsive to a query from the one or more of the applications on the first end node, querying the status information to check aliveness of the at least one application on the second end node.

3. An apparatus as recited in claim 1, wherein the status notice includes one or more of identity, capability, and protocol state of the one or more applications on the first end node.

4. An apparatus as recited in claim 1, wherein the status information has a reachability graph that indicates a route from the first end node to the at least one application on the second end node.

5. An apparatus as recited in claim 4, wherein the reachability graph further indicates aliveness of the one or more applications on the first end node.

6. An apparatus as recited in claim 1, wherein the step of sending a status notice includes sending a status notice periodically at a preset time interval.

7. An apparatus as recited in claim 1, wherein the step of sending a status notice includes sending a status notice responsive to an application on the first end node having a status change.

8. An apparatus as recited in claim 1, wherein the first end node is a virtual machine host server and at least one of the one or more applications on the first end node is a virtual machine.

9. A controller communicatively coupled to a set of end nodes and one or more switches in a network to facilitate communication of status of one or more applications in the network and performing the steps comprising:
   receiving, from each of a set of end nodes, a status notice that includes information of status regarding one or more applications on each of the end nodes;
   compiling at least some of the status notices to generate status information of at least a portion of the one or more applications on the set of end nodes;
   storing the status information into a memory; and
   sending at least a portion of the status information to at least one end node.

10. A controller as recited in claim 9, wherein the status notice from a particular one of the set of end nodes comprises status of all of the one or more applications on the particular end node.

11. A controller as recited in claim 9, wherein the status notice from a particular one of the set of end nodes is related to a portion of the one or more applications on the particular end node that have status change since a preceding status notice was received from the particular end node.

12. A controller as recited in claim 9, wherein the sent status information has a reachability graph that indicates a communication route between a first end node and an application on a second end node via the network.

13. A controller as recited in claim 9, wherein the step of sending the status information is performed periodically at a preset time interval.

14. A controller as recited in claim 9, wherein the step of sending the status information is performed each time when the status notice is received.

15. A computer-implemented method for tracking status of a plurality of end nodes that are communicatively coupled to each other and a controller via a network, the method comprising:

causing an agent on each of the end nodes to generate a status notice that includes information of status of one or more applications on each said node on which the agent is installed; and causing at least one agent to send the status notice to the controller that compiles the status notice to generate status information and sends the status information to one or more of the end nodes.

16. A computer-implemented method as recited in claim 15, wherein the step of causing the at least one agent to send the status notice is performed in response to the one or more applications on an end node where the agent is installed having a status change.

17. A computer-implemented method as recited in claim 15, wherein the step of causing at least one agent to send the status notice is performed periodically at a preset time interval.

18. A computer-implemented method as recited in claim 15, wherein the status information has a reachability graph that indicates a route from one end node to a second end node.

19. A computer-implemented method as recited in claim 15, further comprising:

causing a first end node to store the status information into a memory; and responsive to a query from an application on the first node, querying the status information to check aliveness of one or more applications on a second node.

* * * * *